United States Patent
Ho et al.

(10) Patent No.: US 6,419,363 B1
(45) Date of Patent: Jul. 16, 2002

(54) FIELD SEQUENTIAL DICHROIC LIGHT VALVE

(75) Inventors: Fang Chuan Ho, Hsinchu; Yi-Jen Tsou, Taipei; Rong-Ho Lee, Chiai; Shih-Ping Lee; Jinn-Chou Yoo, both of Hsinchu, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/558,881

(22) Filed: Apr. 26, 2000

(30) Foreign Application Priority Data

Oct. 21, 1999 (TW) ................................... 088118187 A (51) Int. Cl.[7] .............................................. G03B 21/14
(52) U.S. Cl. ............................ 353/20; 353/31; 348/742
(58) Field of Search .......................... 353/31.33, 34.37, 353/20; 348/742, 743; 359/9, 8

(56) References Cited

U.S. PATENT DOCUMENTS

| | | | | |
|---|---|---|---|---|
| 5,111,315 A | * | 5/1992 | Ledebuhr ..................... | 353/20 |
| 5,172,221 A | * | 12/1992 | Ko .............................. | 359/63 |
| 5,357,288 A | * | 10/1994 | Hiroshima et al. ......... | 348/742 |
| 5,365,287 A | * | 11/1994 | Vollmer et al. .............. | 353/31 |
| 5,374,968 A | * | 12/1994 | Haven et al. ................. | 353/31 |
| 5,534,949 A | * | 7/1996 | Baron ........................ | 348/742 |
| 5,565,933 A | * | 10/1996 | Reinsch ..................... | 348/742 |
| 6,183,091 B1 | * | 2/2001 | Johnson et al. ............... | 353/20 |
| 6,247,814 B1 | * | 6/2001 | Lin .............................. | 353/20 |
| 6,309,071 B1 | * | 10/2001 | Huang et al. ................. | 353/31 |

\* cited by examiner

Primary Examiner—William Dowling
(74) Attorney, Agent, or Firm—Beyer, Weaver & Thomas, LLP (57) ABSTRACT

A field sequential dichroic light valve using ferro-electric liquid crystal components and multi-layer thin film broad-band polarizing beam-splitting devices as an optical switch. The field sequential dichroic light valve has a fast time response and a memory function, as well as a switch frequency larger than 180 Hz and an optical transmittance larger than 90%. Accordingly, the field sequential dichroic light valve can effectively switch R, G, B-colored light beams in time sequence, and can be applied to a full-color projection display system.

15 Claims, 7 Drawing Sheets

FIELD SEQUENTIAL DICHROIC LIGHT VALVE

BACKGROUND OF THE INVENTION

1. Field of the Invention

This invention relates to a liquid crystal projection display, and particularly to a field-sequential dichroic light valve.

2. Prior Art of the Invention

Figure 1A:
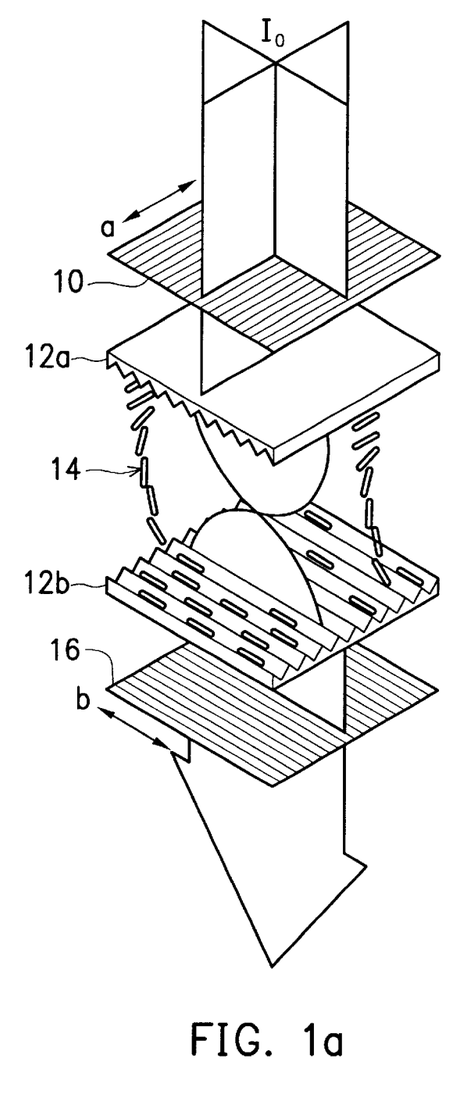
FIGS. 1a and 1b are diagrams illustrating a conventional electric optical switch.
Figure 1B:
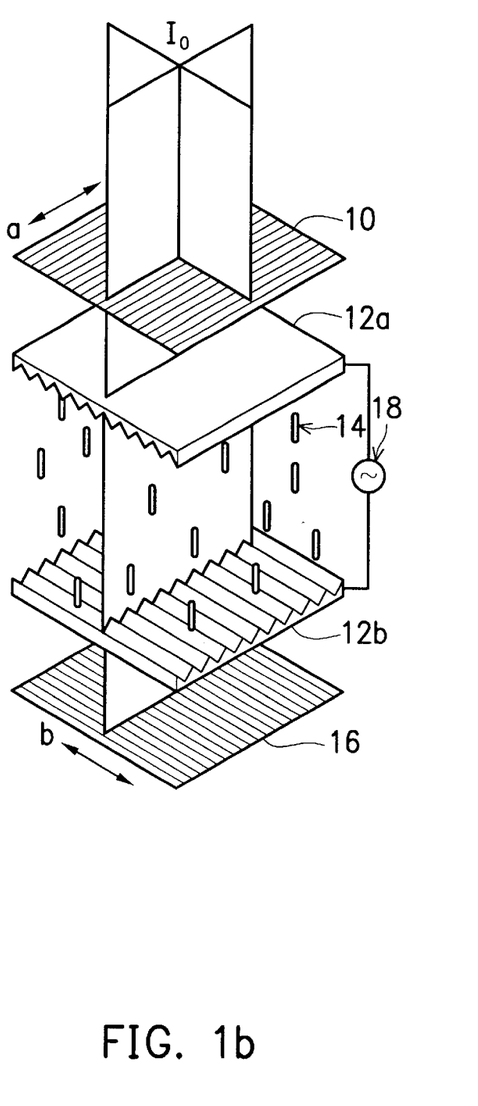

A conventional electronic optical switch can be turned ON/OFF by the rotation of light polarization by a twisted neumatic (TN) liquid crystal component and the effect of an external electric field to the direction of LC principal axis. Referring to FIGS. 1a and 1b, the unpolarized incident light $I_o$ becomes a polarized light having an a-direction polarization after passing through the polarization film 10. The a-direction polarized light changes the polarization direction to b-direction with the effect of the alignment films 12a, 12b and the liquid crystal molecules 14 in the cavity. Therefore, the polarized light can be emitted from the polarized film 16. In FIG. 1b, the liquid crystal molecules 14 will not change the polarization direction of incident light due to the effect of the external electric field of voltage source 18. Therefore, the a-direction-polarized light cannot be emitted through the polarized film 16. The conventional optical switch is not operated in a mechanical manner and has a high contrast. The switch speed of the optical switch can achieve the level of 20~50 msec. However, such a switching speed is not fast enough for a field sequential liquid crystal display, especially for a tri-color projection display system (PDS).

Other prior arts, such as U.S. Pat. No. 5,868,482 of Edlinger et al., U.S. Pat. No. 5,448,314 of Heimbuch et al., and U.S. Pat. No. 5,371,543 of Anderson, utilize the color wheel technology used in conventional TV and PDS products. Operated in a mechanical manner, these prior arts have a low S/N ratio, and it is hard to adjust the time sequence. Furthermore, the different color sectors on the wheel waste optical energy.

Recently, ferro-electric liquid crystal cell (FLC-CELL) products, such as the FLC driving scheme of Displaytech Co., have raised the switch speed to 20 $\mu$sec, and have memory functions that TN LC cells do not have. However, like a TN LCD panel, a FLCD panel needs a dyed PVA polarizer, which has a high absorption for visible light. The light transmittance of a FLCD panel is only about 28~30%. Energy loss is a serious problem for TN LCD and FLCD panels.

Figure 2:
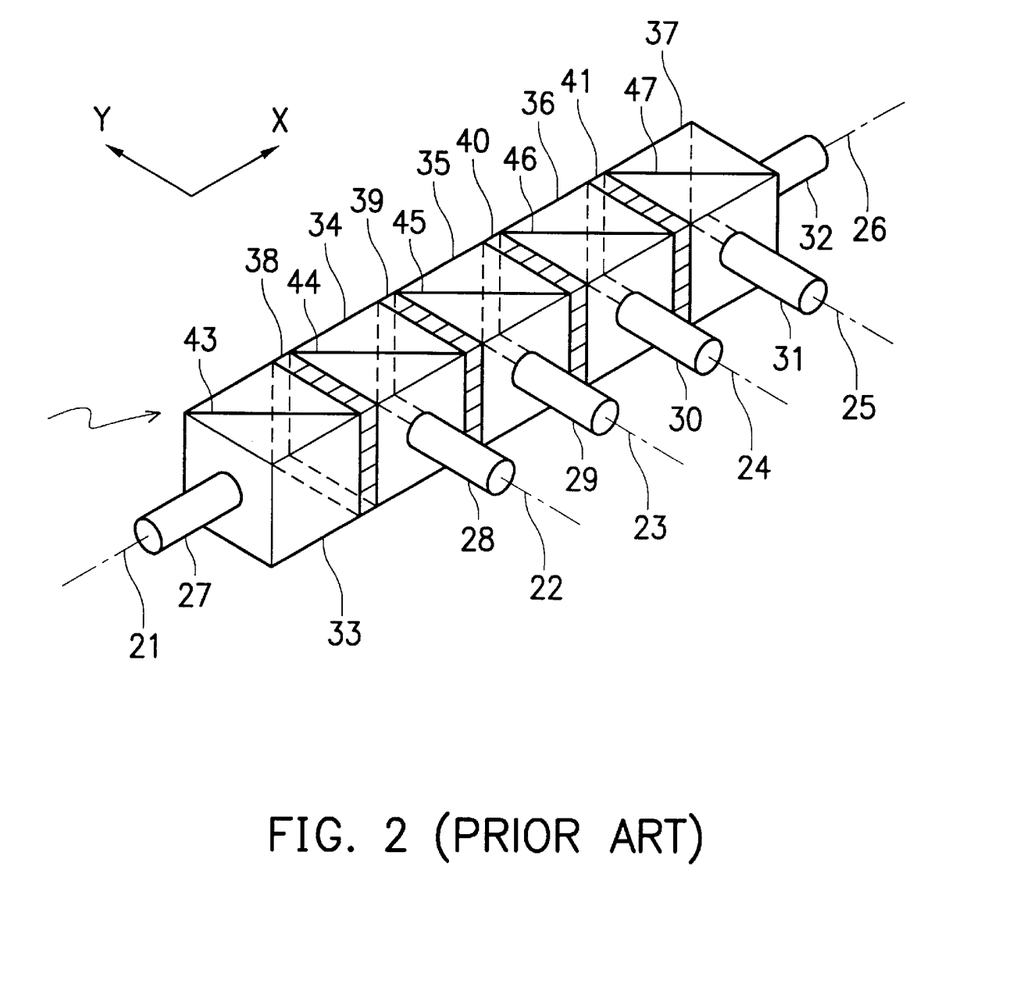
FIG. 2 is a diagram illustrating a conventional multilayer broadband PBS.

To improve the light transmittance of a polarizer, a structure of all dielectric multi-layer film is of interest. However, it is very difficult to design the film system. In the optical communications field, combining a multi-layer film polarized beam splitter with an electric switch to form a single unit has been reported. Many single units are serially arranged to control the direction of the optical path for a predetermined wavelength. However, this device does not have light-combining or light-splitting function. The structure of this device is as shown in FIG. 2., wherein the reference numbers 21~26 indicate optical fibers, reference numbers 27~32 indicate cylinder lenses, reference numbers 33~37 indicate polarized beam splitter (PBS) prisms, reference numbers 38~41 indicate electro-optical components, and reference numbers 43~47 indicate PBSs.

To provide an improved LCD system having a fast time sequential switch mechanism, an electrically controlled switch having a high speed and a high transmittance is required.

SUMMARY OF THE INVENTION

Accordingly, an object of this invention is to provide a field sequential dichroic light valve, which has a fast time response and a memory function.

Another object of this invention is to provide a field sequential dichroic light valve, which has a switch frequency larger than 180 Hz and an optical transmittance larger than 90%.

With an appropriately designed optical thin-film filter, this invention can provide a field sequential light-splitting/combining module in an optical system having a white light source.

To achieve the above objects, this invention provides a time sequential dichroic light valve, which comprises: a first polarizing beam-splitting device for receiving a broadband incident light and emitting a second polarized light of a first spectral range when an energy field is applied thereto; a second polarizing beam-splitting device for receiving a first polarized light and a second polarized light of other spectral ranges except the first spectral range, and emitting the second polarized light of a second spectral range when an energy field is applied thereto; and a third polarizing beam-splitting device for receiving first polarized light and a second polarized light of other spectral ranges except the first spectral range and the second spectral range, and emitting the second polarized light of a third spectral range when an energy field is applied thereto, whereby the energy field is sequentially applied to the first polarizing beam-splitting device, the second polarizing beam-splitting device and the third polarizing beam-splitting device to switch the transmission of the second polarized lights of the first spectral range, the second spectral range and the third spectral range along a selective direction.

BRIEF DESCRIPTION OF THE DRAWINGS

The following detailed description, given by way of example and not intended to limit the invention solely to the embodiments described herein, will best be understood in conjunction with the accompanying drawings in which.

DETAILED DESCRIPTION OF PREFERRED EMBODIMENTS

Figure 3A:
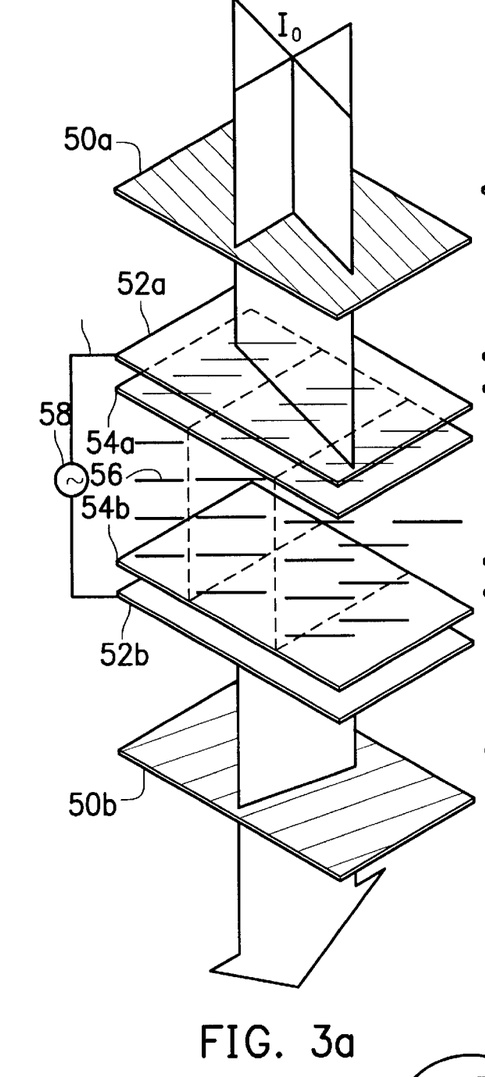
FIGS. 3a to 3c are diagrams illustrating the structure of a ferro-electric liquid crystal cell.
Figure 3B:
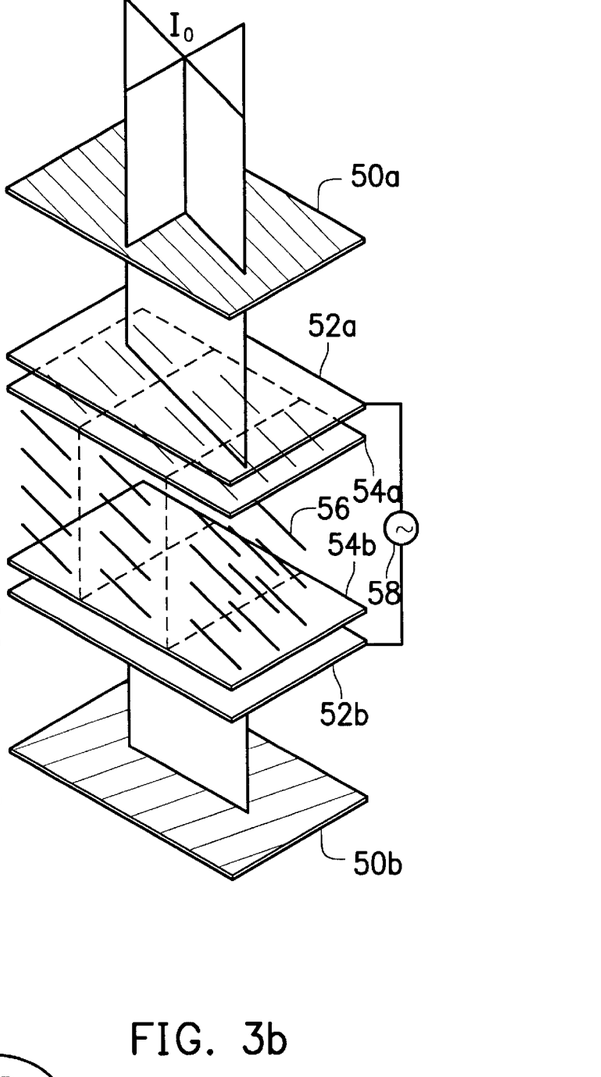

Referring to FIG. 3a and 3b, a ferro-electric liquid crystal cell comprises: a polarizer 50a, an analyzer 50b, ITO glasses 52a and 52b, alignment layers 54a and 54b, ferro-electric liquid crystal molecules 56 and DC electric field 58. According to the drawings, switching the polarity of the DC electric field can make the ferro-electric liquid crystal molecules 56 switch between the bi-stable states of ±θ angle. Thus, the cell can serve as an electric optical path switch to control the optical path of incident light between the polarizer and the analyzer. Referring to FIG. 3a, the incident light $I_o$ becomes polarized light after passing through the polarizer. The polarization of the polarized light rotates to 90° when passing through the ITO glasses 52a and 52b, the alignment layers 54a and 54b and the ferro-electric liquid crystal molecules 56, which are controlled by the electric field +E. Thus, the polarized light can pass the analyzer 50b. The ferro-electric liquid crystal cell is transparent. Referring to FIG. 3b, when an electric field −E having an opposite polarity is applied, the position of the ferro-electric liquid crystal molecule is switched from +θ to −θ. At this time, the optical axis of the incident light passing through the polarizer has the same direction as the ferro-electric liquid crystal molecule. Therefore, the polarization of the polarized light will not change after passing through the ITO glasses 52a and 52b, the alignment layers 54a and 54b and the ferro-electric liquid crystal molecules 56. The polarized light cannot pass through the analyzer 50b.

Figure 3C:
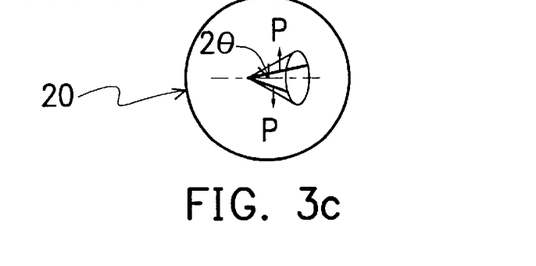

Referring to FIG. 3c, the ferro-electric liquid crystal molecule has a spontaneous polarization P at the direction perpendicular to the long axis of the molecule. The spontaneous polarization fast switches between the bi-stable states of 2θ by the effect of electric field ±E. Furthermore, under this bi-stable state, the ferro-electric liquid crystal molecule has a memory function so that the liquid crystal molecule can remain in the same position even there is no applied electric field. In the application of a display, this implies that the original image remains even if the power supply is cut-off.

Figure 4A:
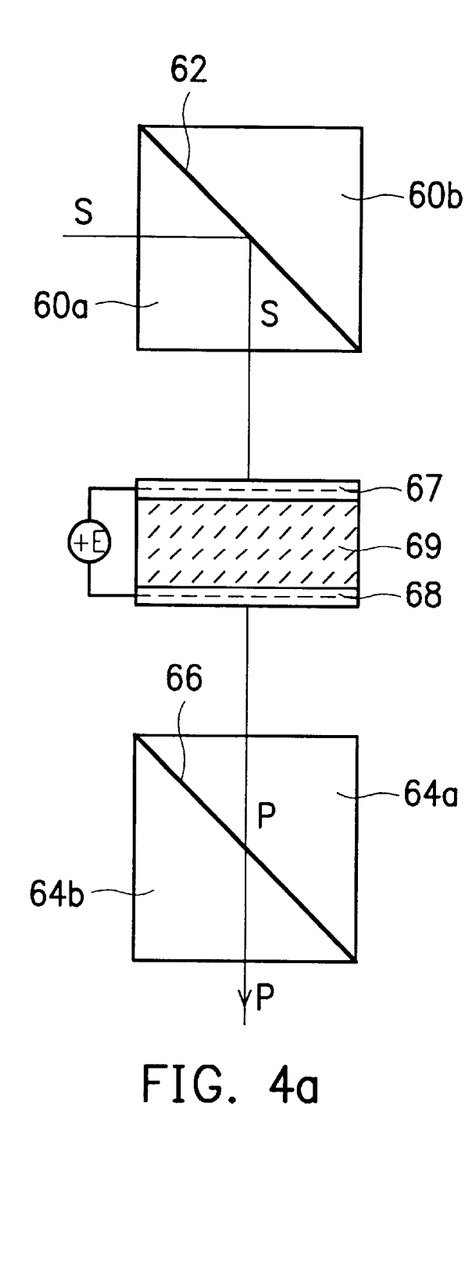
FIGS. 4a and 4b are diagrams illustrating the field sequential dichroic light valve of this invention under an external electric field.
Figure 4B:
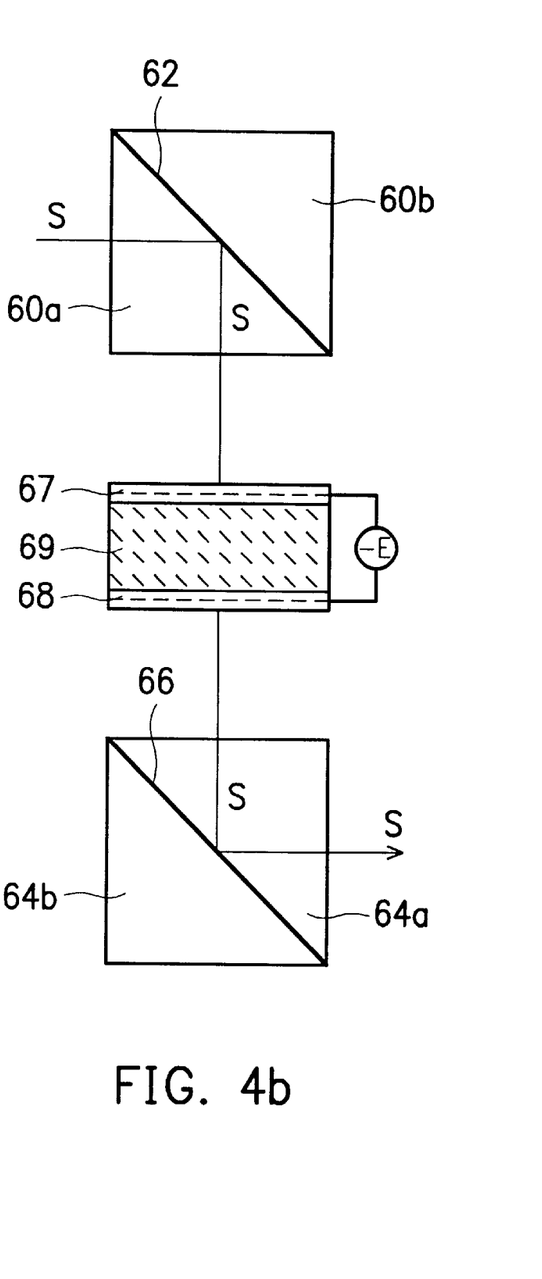

Referring to FIGS. 4a and 4b, the fabrication of this invention is begun by preparing two right-angle prisms by coating a multi-layer thin-film system having a high polarization on the slope of one of the prisms, and then adhering the two prisms to form a cubic polarized beam-splitter. The upper and lower ITO glasses and alignment layers 67, 68 are placed between two cubic polarized beam-splitters. The ferro-electric liquid crystal molecules are then filled in the space between the alignment layers.

FIG. 4a shows the structure of this invention when the applied electric field is +E. The incident s-polarized light is reflected by the broadband polarized beam-splitter 62 on the slope between the prisms 60a and 60b to pass the upper ITO glass and the upper alignment layer 67. Thereafter, the polarization of the polarized light rotates to 90° due to the birefringence of the ferro-electric liquid crystal molecules 69. That is, the s-polarized light is converted to a p-polarized light. After passing through the lower ITO glass and the lower alignment layer 68, the p-polarized light can pass through the broadband polarized beam-splitter 66 on the slope between the prisms 64a, 64b.

On the other hand, referring to FIG. 4b, when the applied electric field is −E, since the principal axis of the ferro-electric liquid crystal molecules is parallel to the electric field, the polarization of the incident s-polarized light is not changed while passing the ferro-electric liquid crystal molecules. Thus, the s-polarized light is reflected by the broadband polarized beam-splitter 66.

In other words, if the incident light is a s-polarized light, FIG. 4a shows the "OFF" state of the ferro-electric liquid crystal light valve, and FIG. 4b shows the "ON" state.

Figure 5A:
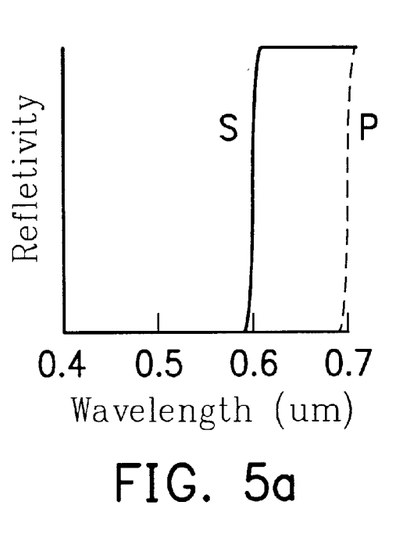
FIG. 5a is the reflective spectrum of a red vertical PBS.
Figure 5B:
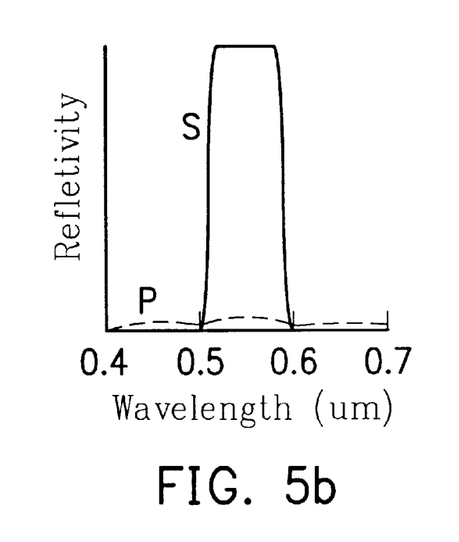
FIG. 5b is the reflective spectrum of a green vertical PBS.
Figure 5C:
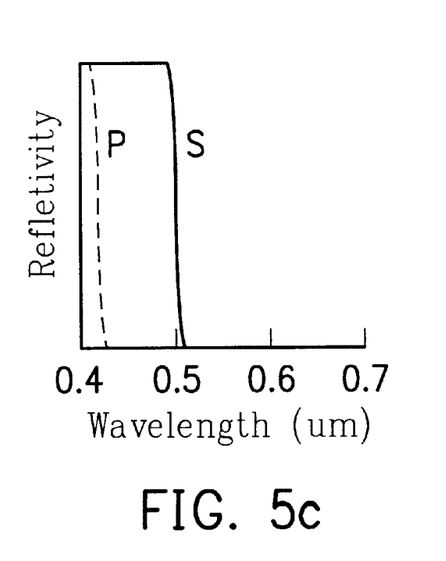
FIG. 5c is the reflective spectrum of a blue vertical PBS.

In the above embodiment, various light valves can be obtained by using various thin-film systems as the multilayer thin film of the polarized beam-splitter 62, 66. Refer to FIG. 5a to FIG. 5c, the multi-layer thin film is a s-polarized red light reflective coating when the relation of reflectivity and the wavelength of incident light for s-polarized light and p-polarized light is as shown in FIG. 5a. If the relation of reflectivity and the wavelength of incident light for s-polarized light and p-polarized light is as shown in FIG. 5b, the multi-layer thin film is an s-polarized green light reflective coating. Thus, the device of FIG. 4 becomes a green light valve. The multi-layer thin film of FIG. 5c is a s-polarized blue light reflective coating.

Figure 6:
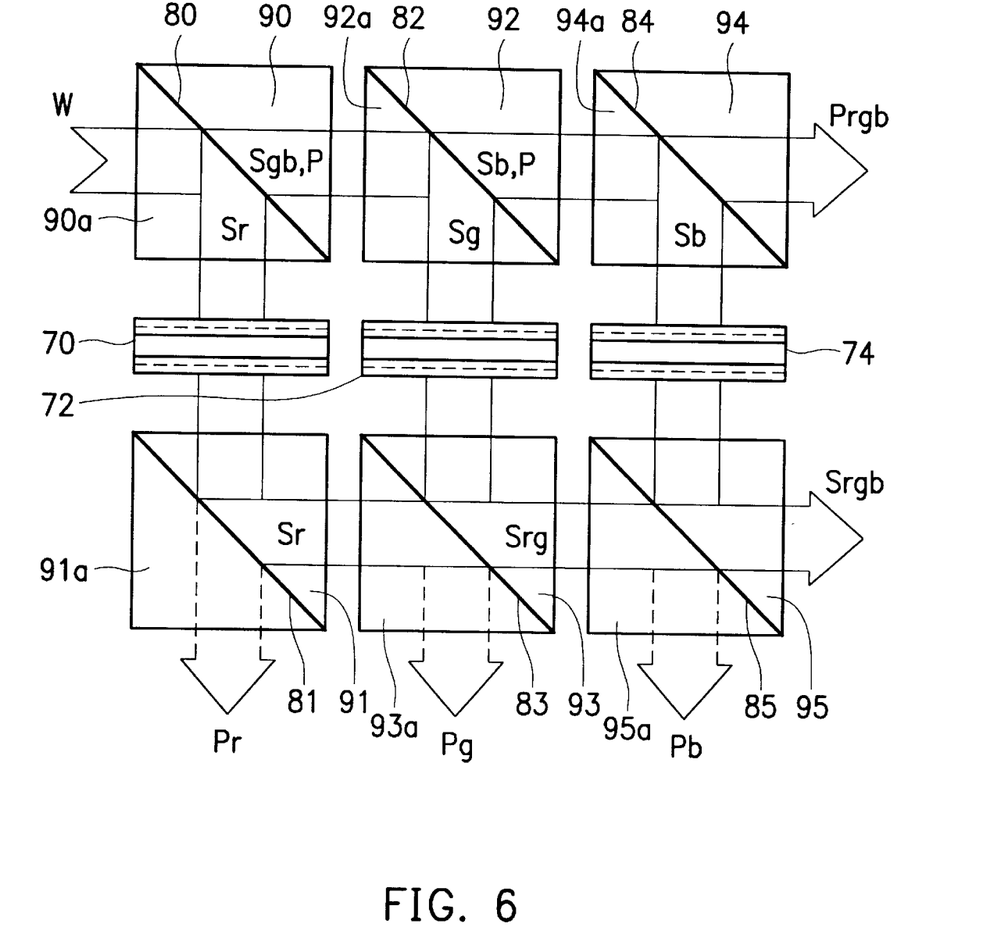
FIG. 6 is a diagram illustrating the tri-color field sequential switch prism module that is made of PBS of FIGS. 5a, 5b and 5c.

Referring FIG. 6, the time sequential dichroic light valve can be obtained by serially arranging three light valves respectively having the features of FIG. 5a, FIG. 5b, and FIG. 5c. The field sequential dichroic light valve comprises: a first polarized beam-splitting device comprising a first polarizing beam-splitting component 80, a second polarizing beam-splitting component 81 and a first light valve 70 which can be controlled by an applied energy field, wherein when a broadband incident light is projected to the first polarizing beam-splitting component 80, a first polarized light of first spectral range is reflected, a second polarized light of the first spectral range and the first and second polarized lights of other spectral ranges pass through the first polarizing beam-splitting component 80, and when the energy field applied to the first light valve 70 is a negative electric field as shown in FIG. 4b, the first polarized light passing through the first light valve 70 is reflected by the second polarizing beam-splitting component 81, however, when the energy field applied to the first light valve 70 is an energy field having a reverse polarization to the negative electric field, the first polarized light of first spectral range is converted to a second polarized light by the first light valve, thus the second polarized light can pass through the second polarizing beam-splitting component 81; a second polarized beam-splitting device comprising a third polarizing beam-splitting component 82, a fourth polarizing beam-splitting component 83 and a second light valve 72 which can be controlled by an applied energy field, wherein when the second polarized light of first spectral range and the first and second polarized lights of other spectral ranges passing through the first polarizing beam-splitting component 80 are projected to the third polarizing beam-splitting component 82, the first polarized light of second spectral range is reflected, the second polarized lights of the first spectral range and the second spectral range and the first and second polarized lights of other spectral ranges except the first spectral range and the second spectral range pass through the third polarizing beam-splitting component 82, and when the energy field applied to the second light valve 72 is a negative as shown in FIG. 4b, the first polarized light of the second spectral range is reflected by the fourth polarizing beam-splitting component 83 to incorporate the first polarized light of the first spectral range reflected by the second polarizing beam-splitting component 81 to emit from the prism 93, however, when the energy field applied to the second light valve 72 is an energy field having a reverse polarization to the negative electric field, the first polarized light of the second spectral range is converted to a second polarized light by the second light valve 72, thus the second polarized light will pass through the fourth polarizing beam-splitting component 83 and emit from the prism 93a; and a third polarizing beam-splitting device comprising a fifth polarizing beam-splitting component 84, a sixth polarizing beam-splitting component 85 and a third light valve 74 which can be controlled by an applied energy field, wherein when the first polarized light and the second polarized light of other spectral ranges except the first spectral range and the second spectral range passing through the third polarizing beam-splitting component 82 are projected to the fifth polarizing beam-splitting component 84, the first polarized light of a third spectral range is reflected and the second polarized light of all spectral ranges passes through the fifth polarizing beam-splitting component 84, and when the energy field applied to the third light valve 74 is a negative electric field as shown in FIG. 4b, the first polarized light passes through the third light valve 74 and is reflected by the sixth polarizing beam-splitting component 85 to incorporate the first polarized lights of the first spectral range and the second spectral range emitted from the prism 93 to emit from the prism 95, however, when the energy field applied to the third light valve 74 is an energy field having a reverse polarization to the negative electric field, the first polarized light of the third spectral range is converted to a second polarized light by the third light valve 74, thus the second polarized light passes through the sixth polarizing beam-splitting component 85 to emit from the prism 95a, so that the transmission of the lights of the three spectral ranges can be sequentially switched along a selected direction by applying an energy field to the first light valve 70, the second light valve 72 and the third light valve 74 in turn.

The operation of the field sequential dichroic light valve is described in detail below. Referring to FIG. 6, when an unpolarized white light W is incident to the red light reflecting filter 80, the s-polarized red light Sr is reflected, and the s-polarized blue light Sb, s-polarized green light Sg and the p-polarized white light are transmitted. When the electric field (−E) is applied to the ferro-electric liquid crystal component 70, s-polarized red light Sr passes through the ferro-electric liquid crystal component 70 and is then reflected by the red light reflecting filter 81 to pass through the green light reflecting filter 83 and the blue light reflecting filter 85, thus emitting from the prism 95. When the electric field (+E) is applied to the ferro-electric liquid crystal component 70, the polarization of the s-polarized red light Sr rotates to 90° after passing through the ferro-electric liquid crystal component 70 so that the s-polarized red light Sr is converted to a p-polarized red light Pr and is emitted from the prism 91a.

The s-polarized blue light Sb, the s-polarized green light Sg and the p-polarized white light passing through the prism 90 are transmitted to the prism 92. The s-polarized green light Sg is reflected by the green light reflecting filter 82. When the electric field (−E) is applied to the ferro-electric liquid crystal component 72, the s-polarized green light Sg passes through the ferro-electric liquid crystal component 72 and is then reflected by the green light reflecting filter 83 to pass through the blue light reflecting filter 85 and emit from the prism 95. When the electric field (+E) is applied to the ferro-electric liquid crystal component 72, the polarization of the s-polarized green light Sg rotates to 90° after passing through the ferro-electric liquid crystal component 72, so that the s-polarized green light Sg is converted to a p-polarized green light Pg that is then emitted from the prism 93a.

The s-polarized blue light Sb and the p-polarized white light passing through the prism 92 are transmitted to the prism 94. The s-polarized blue light Sb is reflected by the blue light reflecting filter 84. When the electric field (−E) is applied to the ferro-electric liquid crystal component 74, the s-polarized blue light Sb passes through the ferro-electric liquid crystal component 74 directly and is reflected by the blue light reflecting filter 85. When the electric field (+E) is applied to the ferro-electric liquid crystal component 74, the polarization of the s-polarized blue light Sb rotates to 90° after the s-polarized blue light Sb passes through the ferro-electric liquid crystal component 74, so that the s-polarized blue light Sb is converted to a p-polarized blue light Pb and emits from the prism 95a.

Figure 7:
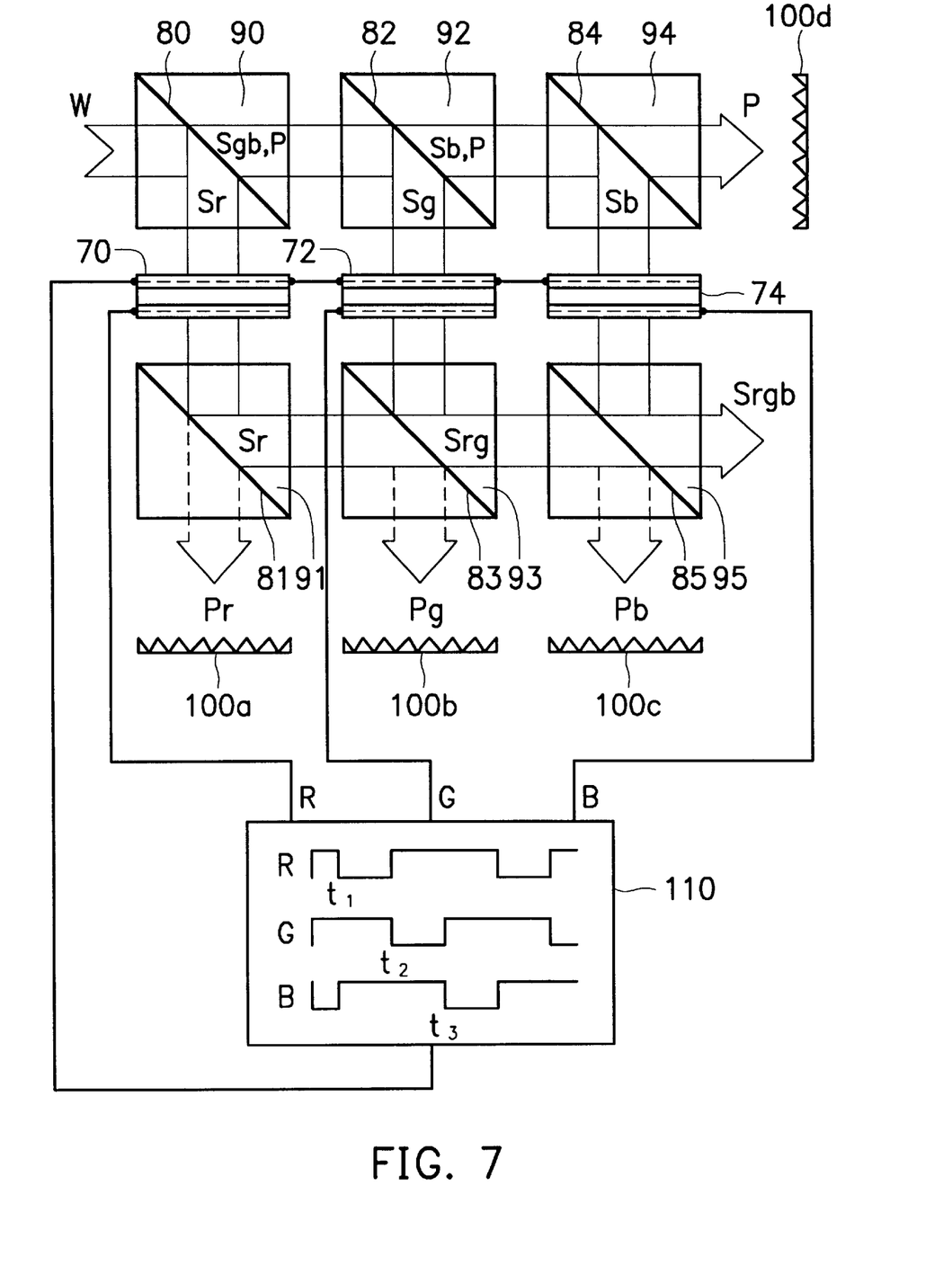
FIG. 7 is a diagram illustrating the structure of a field sequential dichroic light valve according to one embodiment of this invention.

Therefore, when the electric field (−E) is respectively applied to the ferro-electric liquid crystal components 70, 72 and 74 at a time sequence of t=t1, t2, t3, the s-polarized red light Sr, green light Sg and blue light Sb are sequentially emitted from the prism module. However, when the electric field applied to the ferro-electric liquid crystal components 70, 72 and 74 is +E, the p-polarized red light Pr, green light Pg and blue light Pb are respectively emitted from the prisms 91a, 93a and 95a along the direction perpendicular to the incident light W. The p-polarized white light Prgb passes through the prism 90, 92 and 94 to emit out along the path of the incident light W. Referring to FIG. 7, if the p-polarized lights Prgb, Pr, Pg, Pb are useless, the light-absorbing devices 100a~100d can be used to absorb the p-polarized lights. The light-absorbing device, which is composed of at least one layer of thin film or a slab of selected absorbing materials, can be directly coated on the emerging surfaces of the p-polarized lights. FIG. 7 also illustrates a time sequential circuit used in the field sequential dichroic light valve of this invention. The time sequential circuit uses a time sequential signal generating device 110 to produce the time sequential signals R, G, B to respectively control the ferro-electric liquid crystal components 70, 72, 74.

According to the above description, it is understood that the field sequential dichroic light valve of the present invention has the following advantages: First, the light valve has a fast time response in which the switching time is less than 20 $\mu$sec due to the use of ferro-electric liquid crystal. Second, the light valve has a memory feature, which a TN mode liquid crystal component doesn't have, when there is no power supply due to the bi-stability of ferro-electric liquid crystal component. Third, the light valve has a reduced noise and can increased lifespan since there is no mechanical manner in the operating process. Fourth, the light valve has a polarizing beam-splitting function. Fifth, as shown in FIG. 4 and FIG. 5, the light valve can be used to select the optical path or color field.

While the present invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives, which have been discussed above, and all equivalents thereto.

What is claimed is:

1. A time sequential dichroic light valve comprising:
  a first polarizing beam-splitting device for receiving a broadband incident light with a first polarized light and a second polarized light, and emitting a first and a second emitted polarized lights propagating in different optical paths, wherein the first emitted polarized light is the first polarized light of a first wave range which is produced when an energy field of negative polarity is applied to the first polarizing beam-splitting device, and the second emitted polarized light includes the first polarized light, except for that of the first wave range, and the second polarized light;
  a second polarizing beam-splitting device for receiving the second emitted polarized light from the first polarizing beam-splitting device, and emitting a third and a fourth emitted polarized lights propagating in different optical paths, wherein the third emitted polarized light is the first polarized light of a second wave range which is produced when an energy field of negative polarity is applied to the second polarizing beam-splitting device, and the fourth emitted polarized light includes the first polarized light, except for that of the first wave range and the second wave range, and the second polarized light; and a third polarizing beam-splitting device for receiving the fourth emitted polarized light from the second polarizing beam-splitting device, and emitting a fifth and a sixth emitted polarized lights propagating in different optical paths, wherein the fifth emitted polarized light is the first polarized light of a third wave range which is produced when an energy field of negative polarity is applied to the third polarizing beam-splitting device and the sixth emitted polarized light includes the second polarized light, whereby the energy field is sequentially applied to the first polarizing beam-splitting device, the second polarizing beam-splitting device and the third polarizing beam-splitting device to switch the transmission of the first polarized lights of the first wave range, the second wave range and the third wave range along a selective direction.

2. A time sequential dichroic light valve as claimed in claim 1 wherein each of the first polarizing beam-splitting device, the second polarizing beam-splitting device and the third polarizing beam-splitting device is made of two polarizing beam-splitting components and a light valve which can be controlled by an applied energy field.

3. A time sequential dichroic light valve as claimed in claim 1 wherein the energy field is a fast pulse electric field.

4. A time sequential dichroic light valve as claimed in claim 1 wherein the first polarized light is an s-polarized light and the second polarized light is a p-polarized light.

5. A time sequential dichroic light valve as claimed in claim 1 wherein the first polarized light is a p-polarized light and the second polarized light is an s-polarized light.

6. A time sequential dichroic light valve as claimed in claim 1 wherein the first polarized beam-splitting device can reflect s-polarized red light and pass s-polarized blue light, green light and p-polarized light.

7. A time sequential dichroic light valve as claimed in claim 1 wherein the second polarized beam-splitting device can reflect s-polarized green light and pass s-polarized blue light and p-polarized light.

8. A time sequential dichroic light valve as claimed in claim 1 wherein the third polarized beam-splitting device can reflect s-polarized blue light and pass p-polarized light.

9. A time sequential dichroic light valve as claimed in claim 1 wherein the broadband incident light can be replaced by UV light, IR light or microwave, for sequentially switching signals of selected spectral regions of associated light sources.

10. A time sequential dichroic light valve as claimed in claim 2 wherein the light valve is a ferro-electric liquid crystal component.

11. A time sequential dichroic light valve as claimed in claim 2 wherein a light-absorbing layer can be formed on emerging surfaces of all the polarized beam-splitting components to absorb useless light.

12. A time sequential dichroic light valve as claimed in claim 2 further comprising a light-absorbing device, arranged on emerging surfaces of polarized beam-splitting components and composed of at least one layer of thin film or a slab of selected absorbing materials, for absorbing useless light.

13. A time sequential dichroic light valve as claimed in claim 2 wherein the polarized beam-splitting component is a polarized beam-splitting prism formed by two right-angle prisms having a multi-layer film coated on the slope of the prisms.

14. A time sequential dichroic light valve as claimed in claim 12 wherein the light-absorbing device is a black coating.

15. A time sequential dichroic light valve comprising:

a first polarizing beam-splitting device for receiving a broadband incident light with a first polarized light and a second polarized light, the first polarized light having a particular orientation and the second polarized light having a different orientation than the first polarized light, and emitting the first polarized light of a first spectral range when an energy field is applied thereto;

a second polarizing beam-splitting device for receiving the first polarized light and the second polarized light from the first polarizing beam-splitting device, the first polarized light including at least a second and a third spectral range, and emitting the first polarized light of the second spectral range when an energy field is applied thereto; and a third polarizing beam-splitting device for receiving the first polarized light and the second polarized light from the second polarizing beam-splitting device, the first polarized light including at least the third spectral range, and emitting the first polarized light of the third spectral range when an energy field is applied thereto, whereby the energy field is sequentially applied to the first polarizing beam-splitting device, the second polarizing beam-splitting device and the third polarizing beam-splitting device to switch the transmission of the first polarized lights of the first spectral range, the second spectral range and the third spectral range along a selective direction.

* * * * *